United States Patent
Axelrod et al.

(10) Patent No.: US 8,136,400 B2
(45) Date of Patent: Mar. 20, 2012

(54) ACCELEROMETER

(75) Inventors: Noel Axelrod, Jerusalem (IL); Eran Ofek, Modi'in (IL)

(73) Assignee: Physical Logic AG, Zug (CH)

( * ) Notice: Subject to any disclaimer, the term of this patent is extended or adjusted under 35 U.S.C. 154(b) by 756 days.

(21) Appl. No.: 12/267,734

(22) Filed: Nov. 10, 2008
(Under 37 CFR 1.47)

(65) Prior Publication Data
US 2009/0139331 A1 Jun. 4, 2009

Related U.S. Application Data

(60) Provisional application No. 60/988,114, filed on Nov. 15, 2007.

(51) Int. Cl.
*G01P 3/04* (2006.01)
(52) U.S. Cl. ......................................................... 73/510
(58) Field of Classification Search ................... 73/488, 73/510, 514.01
See application file for complete search history.

(56) References Cited

U.S. PATENT DOCUMENTS

| 5,650,568 | A  | * | 7/1997 | Greiff et al. | 73/504.09 |
| 5,659,195 | A  | * | 8/1997 | Kaiser et al. | 257/415 |
| 6,236,005 | B1 | * | 5/2001 | Kvisteroey et al. | 200/61.45 R |
| 6,765,160 | B1 | * | 7/2004 | Robinson | 200/61.45 R |
| 6,910,379 | B2 | * | 6/2005 | Eskridge et al. | 73/504.14 |
| 7,617,729 | B2 | * | 11/2009 | Axelrod et al. | 73/514.32 |
| 2005/0132803 | A1 | * | 6/2005 | Baldwin et al. | 73/514.32 |

\* cited by examiner

*Primary Examiner* — Max Noori
(74) *Attorney, Agent, or Firm* — Mark M. Friedman

(57) ABSTRACT

A 3-dimensional MEMS accelerometer fabricated on a single planar substrate deploys three co-planar sensor elements. Each sensor element is a capacitive device deploying a static electrode plate and a parallel dynamic electrode plate supported by a torsion beam. The dynamic electrode plate also includes a proof mass portion that displaces the center of gravity to below the plane of the plate. Two of the sensor elements are identical and rotated by 90 degrees on the planar substrate. The third capacitive sensor has two pairs of adjacent capacitive plates, each one having a dynamic electrode plate is suspended by a torsion beam. The proof mass on each dynamic electrode plates however is offset laterally from the torsion axis in opposite directions from the other plates to cancel the their respective capacitance charges induced by in-plane acceleration. However, this arrangement also adds the capacitive change induced by acceleration orthogonal to the planar substrate.

18 Claims, 13 Drawing Sheets

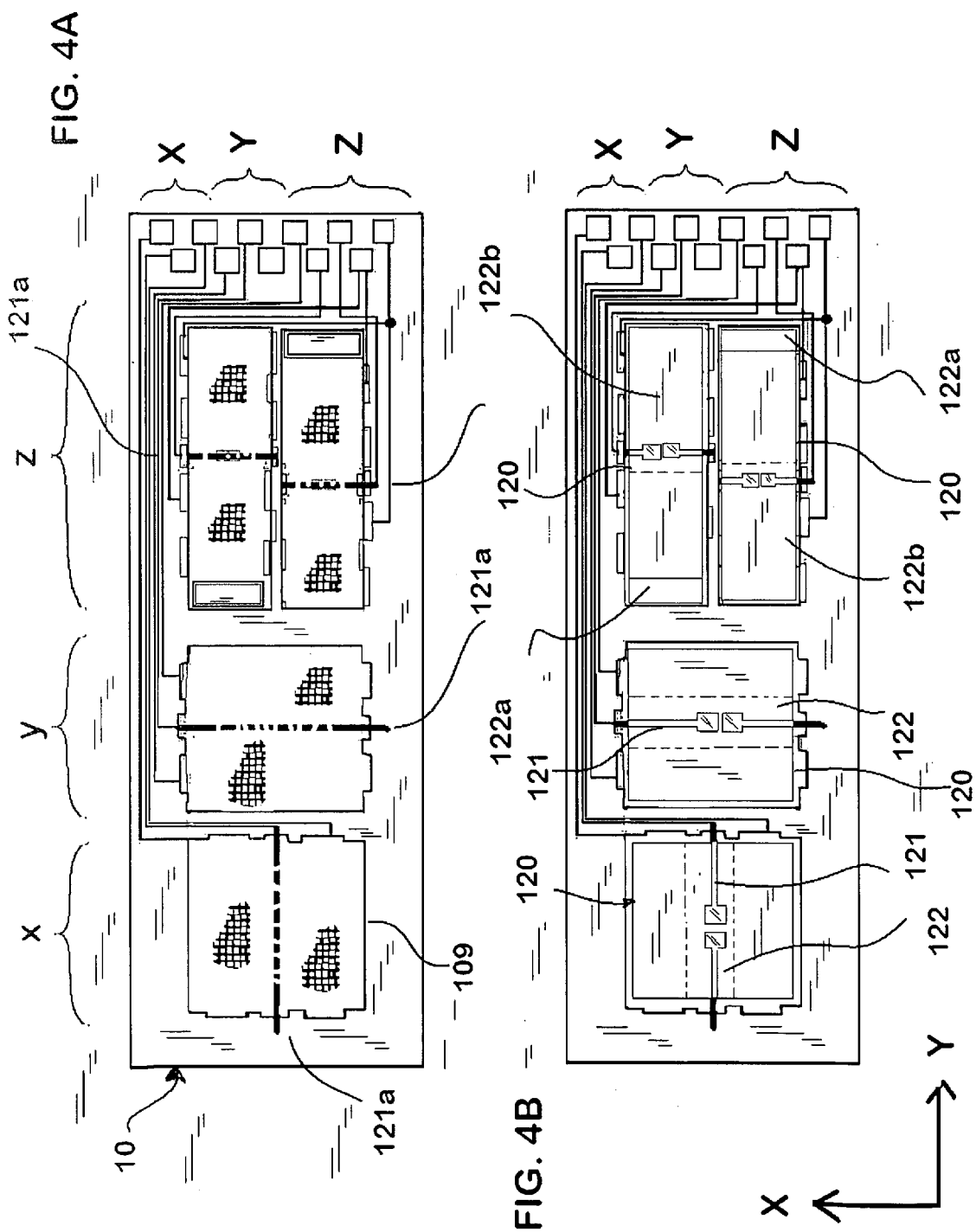

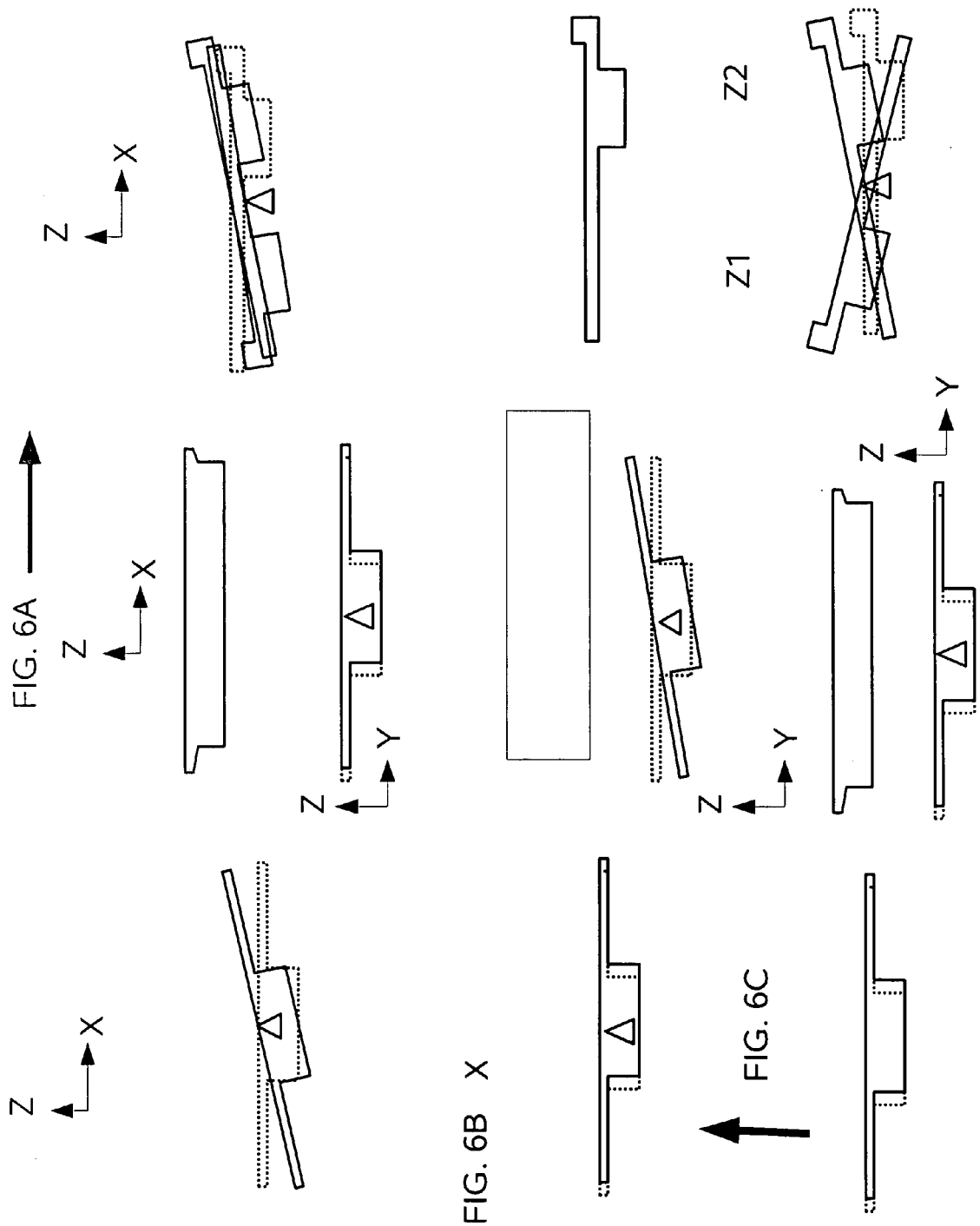

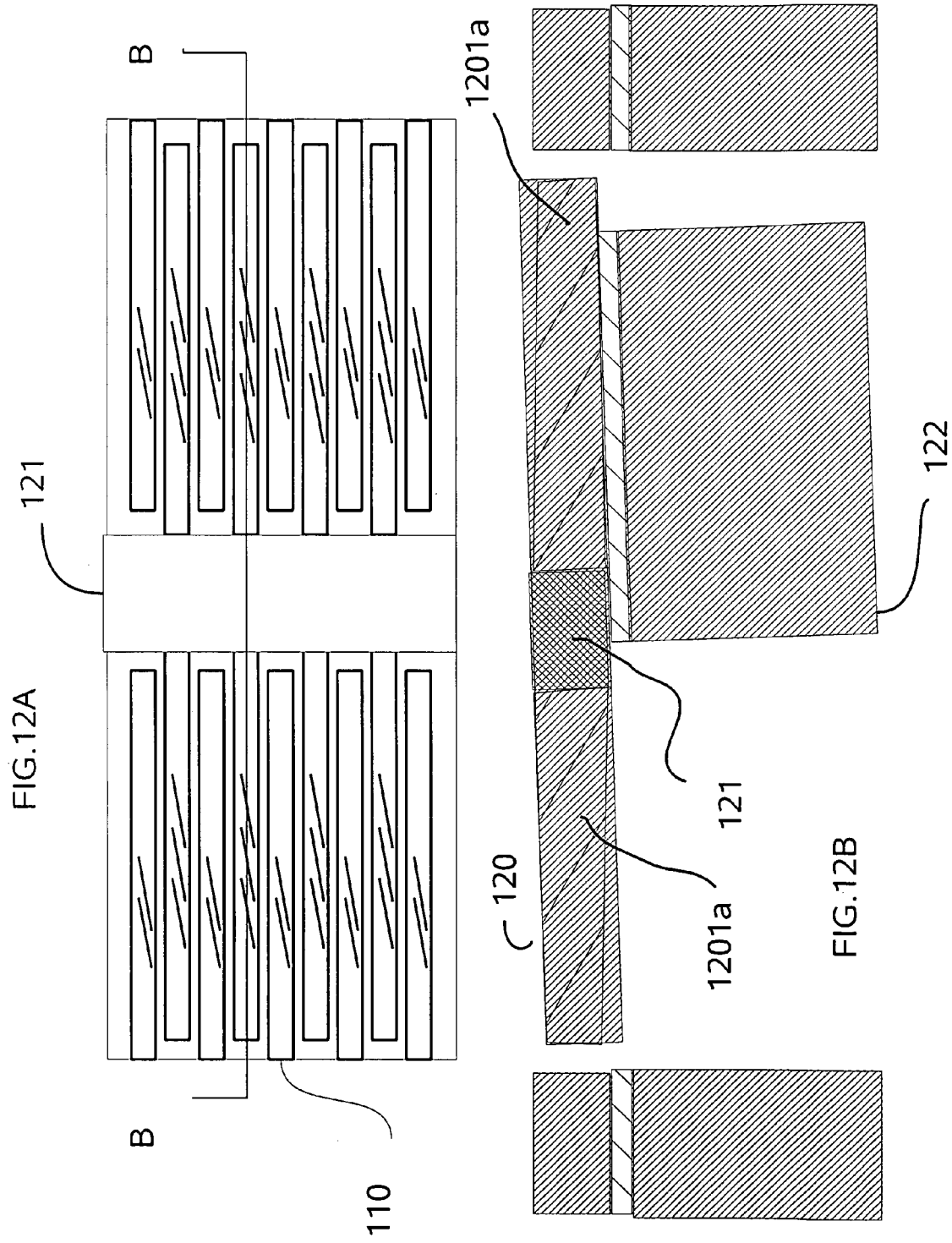

ACCELEROMETER

CROSS REFERENCE TO RELATED APPLICATIONS

The present application claims priority to the US provisional application for an "Accelerometer" having application Ser. No. 60/988,114, which was filed on Nov. 15, 2007, which is incorporated herein by reference

BACKGROUND OF INVENTION

The present invention relates to micro-mechanical electrical systems (MEMS) type device for measuring vibration and movement, and more particularly to a MEMS accelerometer.

MEMS type devices for use as sensors and accelerometers are well known. Such devices are generally fabricated on a silicon or related planar substrate by semi-conductor manufacturing type methods, such as the use of photo-resists, masks and various etching processes to fabricate a proximity sensor that includes a suspended proof mass member and means to measure the deflection of the proof mass suspending means. Such devices have inherent limitations on the minimum size, detection limit, sensitivity and the like, largely due to the means used for detecting the deflection of the proof mass.

It is therefore a first object of the present invention to provide 3-dimensional capacitive accelerometer that could be fabricated using a single process.

Yet a further objective is to provide maximum capacitive sensitivity with minimum packaged size of the accelerometer. Obtaining this objective enable a highly efficient accelerometer that provides maximum response with minimum power demands.

It is still a further object of the invention to provide a means to combine multiple accelerometers in a configuration for the simultaneous measurement acceleration in three dimensions.

It is a further objective to provide such a 3-dimensional accelerometer that can be used in cardiovascular applications for example, in a linear structure that is easy for fabrication and packaging in a lead or catheter.

SUMMARY OF INVENTION

In the present invention, the first object is achieved by providing an accelerometer device comprising a substantially planar substrate having an aperture frame therein, one or more static electrodes plates extend into an over the aperture frame from the edge thereof, at least one dynamic electrode plate disposed below said one or more first electrode and supported by at least one torsion beam that spans the aperture, a proof mass coupled to and disposed below said dynamic electrode plate such that the COG (center of gravity) is below the plane of the dynamic electrode, wherein at least one capacitive sensing circuit is defined by the electrical communication between said static electrode plate and said dynamic electrode plate.

A second aspect of the invention is characterized in by the accelerometer for sensing acceleration perpendicular to a substantially planar substrate having at least two aperture frames disposed therein, one or more static electrodes plates extend into and over each aperture frame from the edge thereof, At least one dynamic electrode plate disposed below said one or more static electrode plates associated with each aperture frame, wherein at least one capacitive sensing circuit is defined by the electrical communication between said one or more static electrode plate and said dynamic electrode plates, each dynamic electrode plate comprising, at least one torsion beam portion that spans the aperture frame to suspend each dynamic electrode plate below said one or more static electrode plates associated with the aperture frame, each beam portion being parallel and disposed in the common plane parallel with the plane of said substrate, a proof mass coupled having at least a portion below the upper plan of the substrate, each proof mass is offset from the axis of the associated torsion beam portion; below each dynamic electrode plate such that the COG (center of gravity), and laterally in the opposite directions from another dynamic plate to cancel the their respective capacitive charges induced by acceleration in the plane of the substrate and add the capacitive charges induced by acceleration orthogonal to the plane of the substrate.

Another object of the invention of providing a 3-dimension accelerometer is achieved by combining on a common planar substrate two orthogonal disposed accelerometer devices for measuring acceleration in the plane of the substrate in line adjacent a third accelerometer for sensing acceleration perpendicular to a substantially planar substrate.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 4A is a plan view of the static electrode layer of an embodiment of a 3-Dimensional accelerometer, which includes the embodiment shown in FIG. 2 as well as that shown in FIG. 3.

FIG. 4B is a plan view of the dynamic electrode layer of the embodiment of FIG. 4A.

FIG. 6A-C is a schematic diagram illustrating the movement of each of the dynamic electrodes and proof masses in FIG. 4 for X, Y and Z acceleration respectively.

FIG. 12A is a plan view of an alternative embodiment of the accelerometer of FIG. 3. whereas FIG. 12B is a cross-section elevation of the same as reference line B-B.

DETAILED DESCRIPTION

Figure 1:
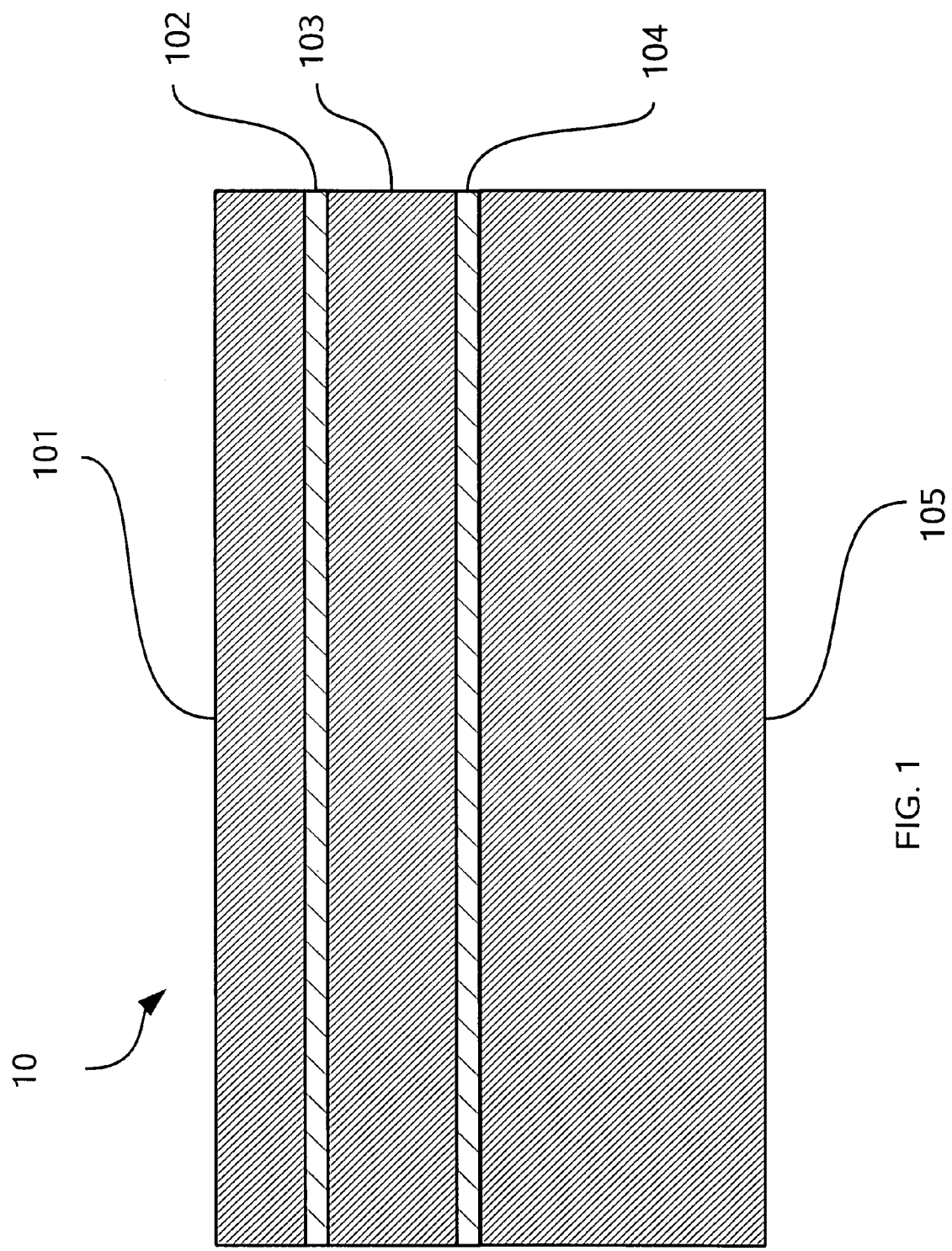
FIG. 1 is a cross-section view of the substrate.

Referring to FIGS. 1 through 12, wherein like reference numerals refer to like components in the various views, there is illustrated therein a new and improved accelerometer, generally denominated 100 herein.

Accelerometers fabricated on semiconductor substrates such as silicon wafers are well known. They frequently deploy one or more static electrodes spaced apart from dynamic electrodes that move in response to acceleration. A silicon substrate from which the structure is fabricated is also etched in some manner to form a spring or hinge that allows the dynamic electrode to move. The change in capacitance between the static and dynamic electrodes, upon movement of the dynamic electrode, is used to quantify the magnitudes and direction of the movement. The dynamic electrode acts as the proof mass that increases its movement in response to the acceleration.

In accordance with the present invention, the accelerometer is preferably a MEMS device fabricated from a double silicon oxide layer substrate shown in FIG. 1. In this embodiment, double silicon oxide layer substrate 10 is preferably comprised of at least 5 layers. The first or device layer 101 is preferably made out of doped crystalline silicon (Si(c)) that is preferably 10 μm thick and is separated from the second device layer 103 by a buried oxide layer 102 which is about 2.5 μm thick. The second device layer 103, also is preferably comprised of doped Si(c) and has a thickness of about 15 μm; it is, in turn, separated from the bottom or handle layer 105 by another buried oxide layer 104 (also about 2.5 μm thick). The handle layer is preferably about 680 μm thick and is also preferably comprised of Si(c).

Figure 2:
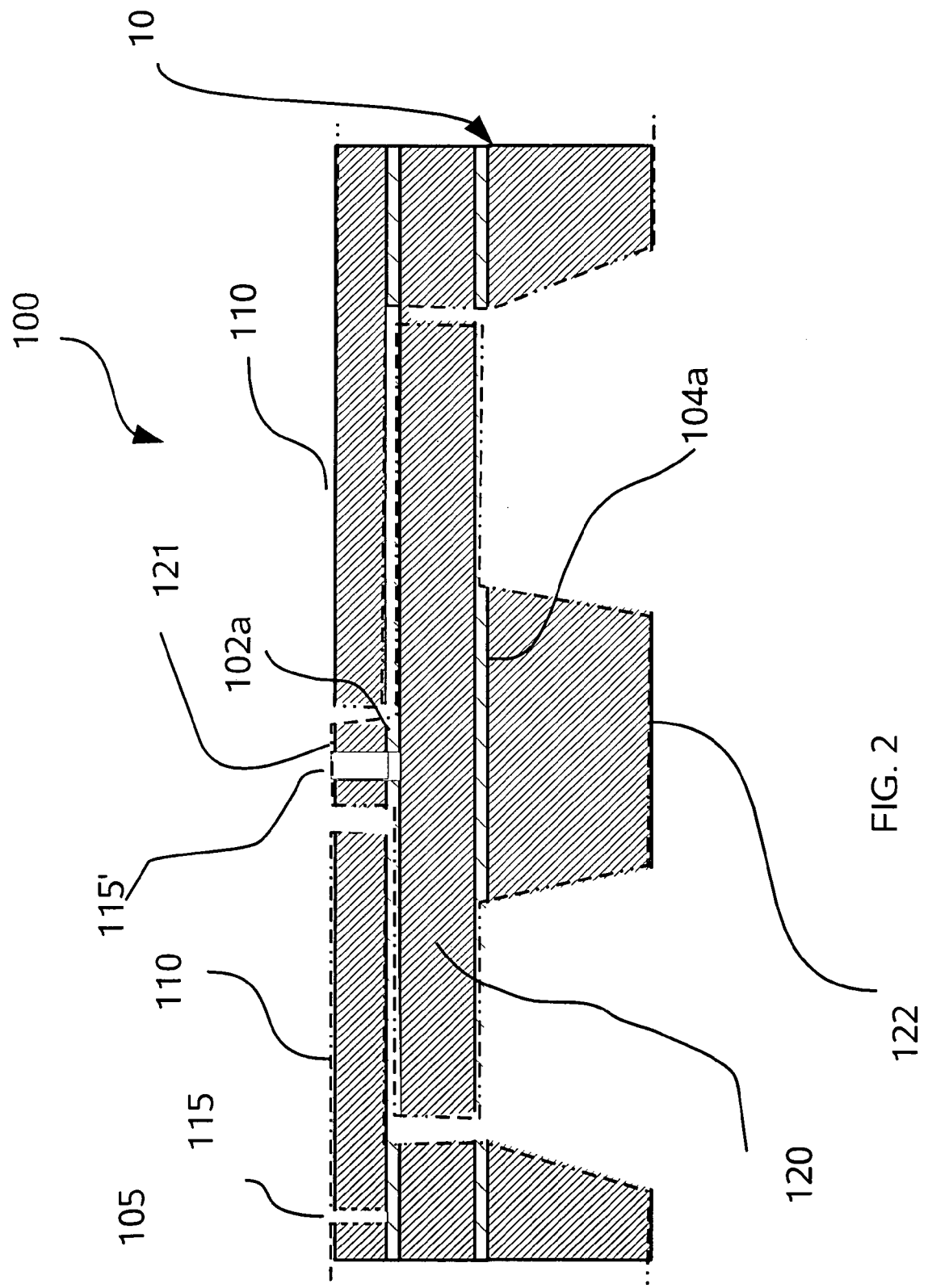
FIG. 2 is a cross-section view of the of FIG. 1 substrate as etched to form a first embodiment.
Figure 3:
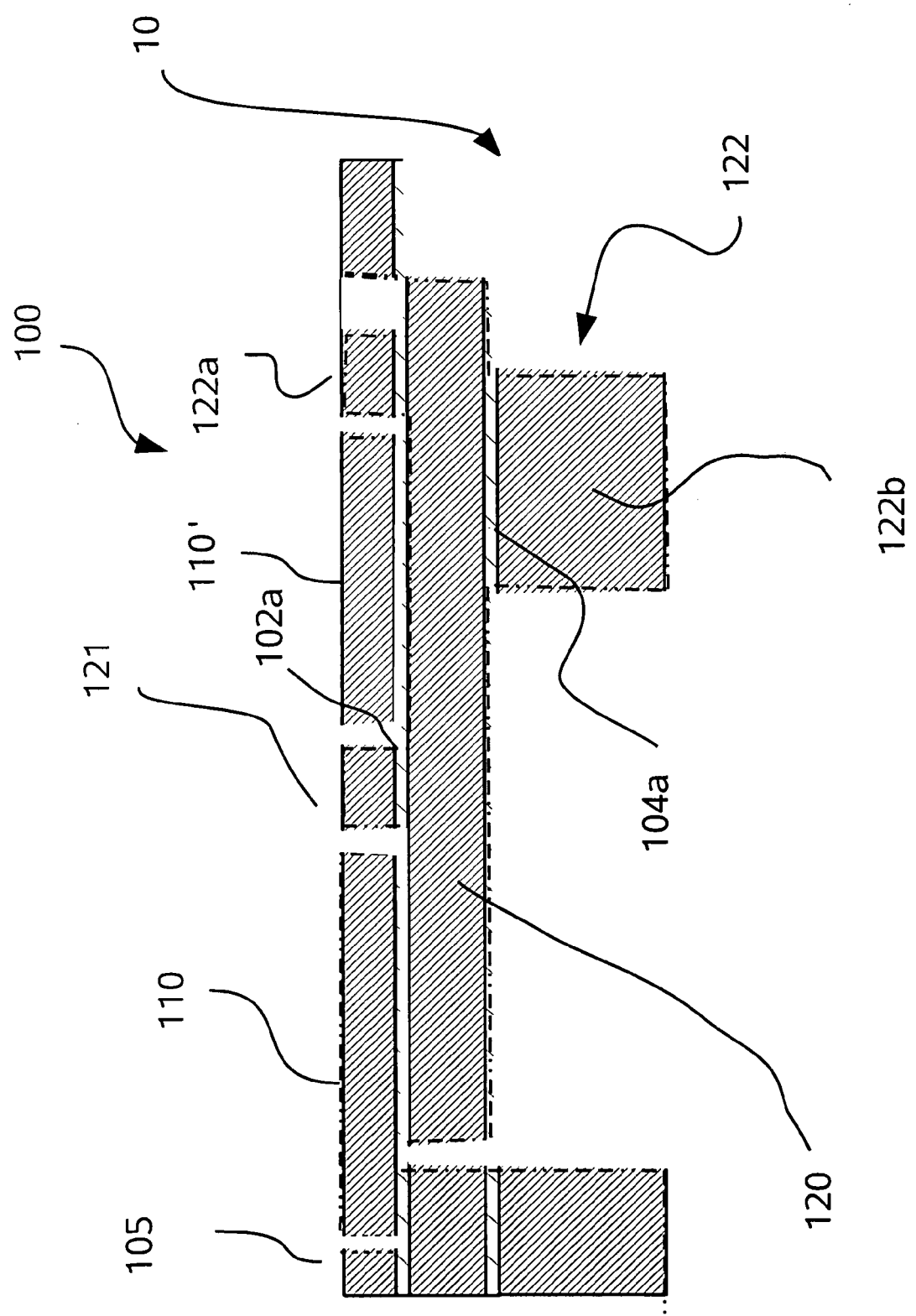
FIG. 3 is a cross-section view of the substrate of FIG. 2 as etched to form a second embodiment.

As shown in FIGS. 2 and 3, the double silicon oxide layer enables a preferred means for device fabrication wherein the static electrode 110 is formed in the first or device silicon layers 101 and a dynamic electrode 120 is formed in the second device layer 103. As the dashed or broken line indicates an etch boundary, wherein portions of each silicon or silicon oxide layers are partially etched away to define and release the static 110 and dynamic electrodes 120. Thus, as is illustrated in FIG. 2 and FIG. 3, the etch boundaries also define the extent of the static and dynamic portions of the device. The upper silicon oxide layer 102 is etched away to release the static upper electrode portion 110 from the lower dynamic electrode 120. However, only a portion of the handle layer 105 is etched away to provide for a large proof mass portion 122 that is attached to the bottom of the otherwise planar dynamic electrode 120.

As will be shown in additional embodiments and examples, the first silicon oxide layer 102 is preferably etched away through holes that are formed in the static electrode layer 110, thus releasing the dynamic electrode 120, which is connected to the substrate at a spring or beam element 121 formed in the first device layer 101. Thus, a portion 102a of the first silicon oxide layer 102 remains to connect this spring or beam element 121 to the dynamic electrode 120.

Another portion 104a of the second silicon oxide layer 104 remains to connect the bottom of the dynamic electrode 120 to the proof mass 122 formed in the handle layer 105. As the proof mass 122 is attached to the back or lower side of the dynamic electrode 120 it is preferably defined by etching the back or handle side of the wafer 122.

The electrodes of the device 100 are formed within an aperture type frame 109 in a planar substrate, as shown in FIG. 4. The term aperture frame is intended to indicate the general region that is a least partially etched to define the static and dynamic electrode elements. Thus, the upper or front side of substrate 100 is masked to define the aperture 109 and the full extent of the static and dynamic electrode, while the lower or back side of substrate 100 is masked to define the proof mass 122 dimensions. The etching of a complete open aperture is not necessary, as a portion of the upper silicon layer 101 remains to connect the static electrode 110 mechanically, as well as to provide one or more electrical contacts. However, to the extent that the static electrode contacts the edge of the frame, a trench 115 that extends to the first silicon oxide layer 102 is provided to electrically isolate the electrode from the surrounding silicon layer 101 of substrate 10 on the other side of the aperture frame. Further, in preferred embodiments, such trenches 115 are also used to subdivide the static electrode into two or more regions, labeled with A and B as a suffix to the reference numerals in FIG. 5, to provide differential capacitive sensing. Thus, the aperture frame 109 represents the linear extension of a plurality of isolation trenches and completely etched regions that collectively electrically isolate the static electrode. It should be appreciated that in the 3-dimensional sensing device of FIG. 4, all three accelerometer elements used to sense X, Y and Z axis acceleration can be formed within a single frame, or three separate adjacent frames on the same substrate 100.

In the embodiment in FIG. 2 the proof mass is symmetrically disposed on opposite sides of the torsion beam portion 121, with the center of gravity of the effective proof mass assembly disposed below the torsion beam axis.

In contrast, in the device 100 of FIG. 3, the proof mass 122 is offset to the right of the torsion beam axis 121, and comprises both an upper proof mass 122a and a lower proof mass 122b. The upper proof mass 122a extends through an additional portion of the aperture 109, or an additional aperture etched in the device layer 101 of substrate 10. The extension of the proof mass above and below the dynamic electrode 120 increase the magnitude of the mass and further extends the center of gravity away from directly under the torsion beam axis to increase device sensitivity.

As the center of gravity of the proof mass 122 and dynamic electrode 120 combination is below the plane of the dynamic electrode 120, any acceleration in the plane of the substrate having a component perpendicular to the torsion beam axis 121a will cause the dynamic electrode to tilt about this axis. Hence the gap between the static and dynamic electrodes will vary from the constant value in the resting state, defined by the thickness of oxide layer 102. That is, the gap will become smaller at one end of the dynamic electrode extended away from the torsion axis in the direction of the acceleration vector. As the gap at the other end of the dynamic electrode increases, it is desirable to electrically isolate opposing halves of at least one of the dynamic and static electrodes plates to form either a half or full bridge capacitive circuit. This permits differential measurements using the circuit shown in FIG. 7. Such isolation is provided by trench 115'. It should be understood that in the embodiments shown in FIGS. 2 and 3 that the gap between static 110 and dynamic electrodes plates 120 varies with distance from the torsion beam axis 121a.

It should be appreciated that the holes in the static electrode plate 110 not only permit etching away the first silicon oxide layer 102, and release of the release dynamic electrode 120, but also reduce air damping effect by releasing (or admitting) air as the gap between the static and dynamic electrodes decreases (or increases).

It is also preferred to limit the effective capacitive size of the static electrode 110 by using a trench to electrically isolate the sub-region closest to the torsion spring member 121, as this minimizes the response non-linearly as the gap in this sub-region changes more rapidly being closer to the torsion beam 121.

Alternatively, the static and dynamic electrodes need not be disposed one above the other as shown in FIGS. 2 and 3, but can be configured as shown in FIGS. 12A and 12B wherein a substrate 10 with a single buried oxide 102 layer is etched to provide the lower proof mass 122, but with the static 110 and dynamic 120 electrodes both formed as a plurality of alternating interdigitated fingers in the upper silicon layer such that as the dynamic electrode rotates. As shown in FIG. 12B, the gap between electrodes remains constant, but the projected overlapping area between electrodes decreases, as indicated by the widely hatched regions 1201a and 1201b.

FIG. 4A is a plan view showing the substrate 10 with at least one aperture frame 109 supporting an array of static electrodes 110 in three accelerometer devices denoted X, Y and Z for measuring acceleration in the X, Y and Z axis respectively. Conductor traces 130 lead from each accelerometer to a series of terminal pads at the right edge of the device. Broken lines 121a illustrate the orientation of the torsion beam axis for each accelerometer element. The electrically isolated halves of each static electrode are denoted 110A and 110B, each leading to a separate terminal pad at the right side of device 100. The dynamic electrode 120 of each separate X, Y and X device on substrate is labeled C and is connected to a separate terminal pad thus labeled at the right side of device 100. Thus for each of the X and Y accelerometer elements there is a set of three terminal pads, grouped by brackets labeled X and Y. FIG. 4B is a section parallel to the view of FIG. 4A to shown the dynamic electrode layout.

Figure 5A:
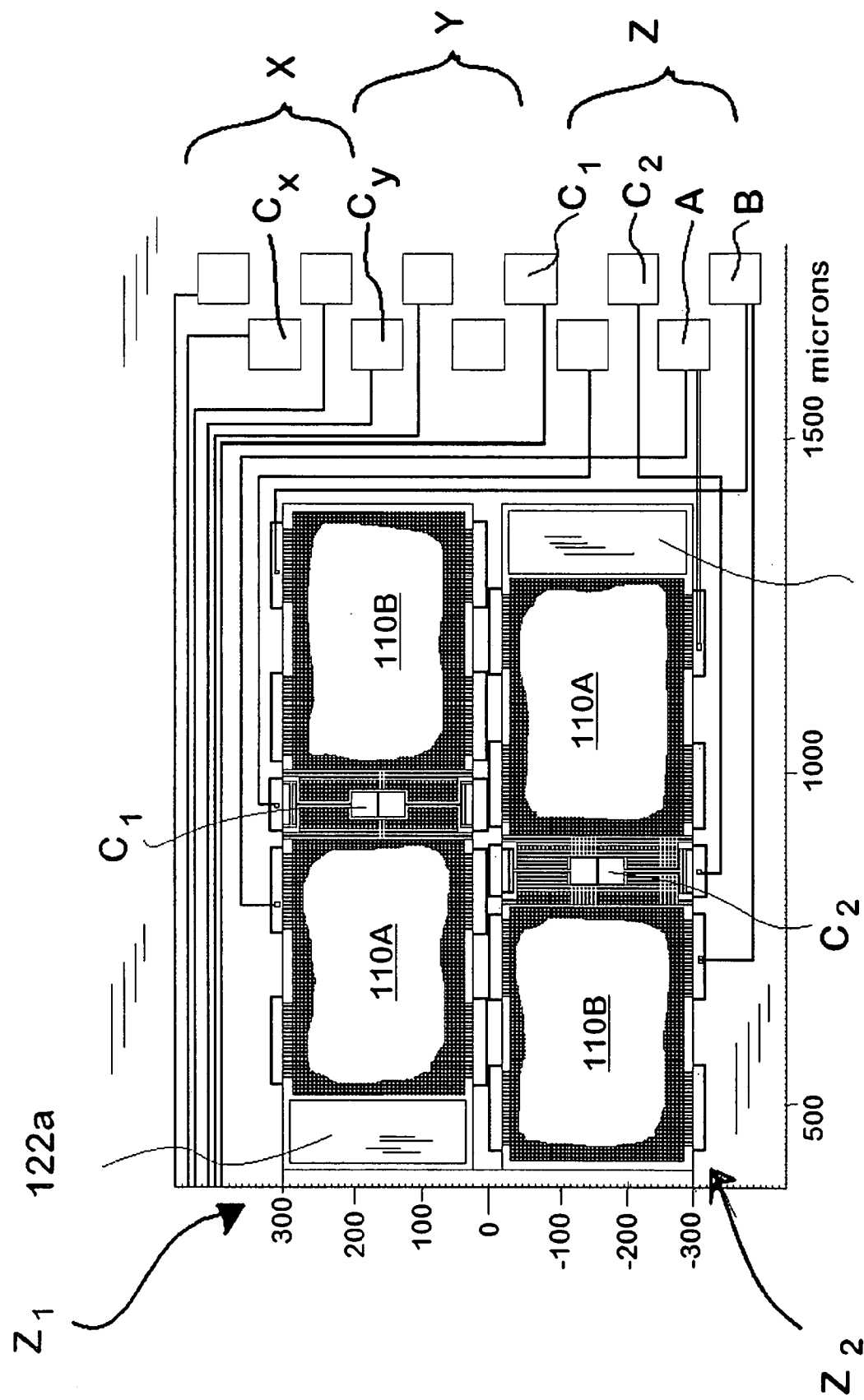
FIG. 5A is a plan view of the Z-axis accelerometer of FIG. 4A.

FIG. 5A is a more detailed plane view of the Z-axis accelerative sensor having two device Z1 and Z2. Each of Z1 and Z2 has the static electrode split into two portions 110A and 110B. However, the A portions of static electrodes for Z1 and Z2 connect at a common terminal pad A (via metal or conductive traces 130) whereas the B portions of static electrode for Z1 and Z2 connect at a different common terminal pad each being electrically isolated from the other conductive layers or portion of substrate 10. The dynamic electrodes of each of Z1 and Z2; labeled C1 and C2; are connected to different isolated pads with the same labels.

Figure 5B:
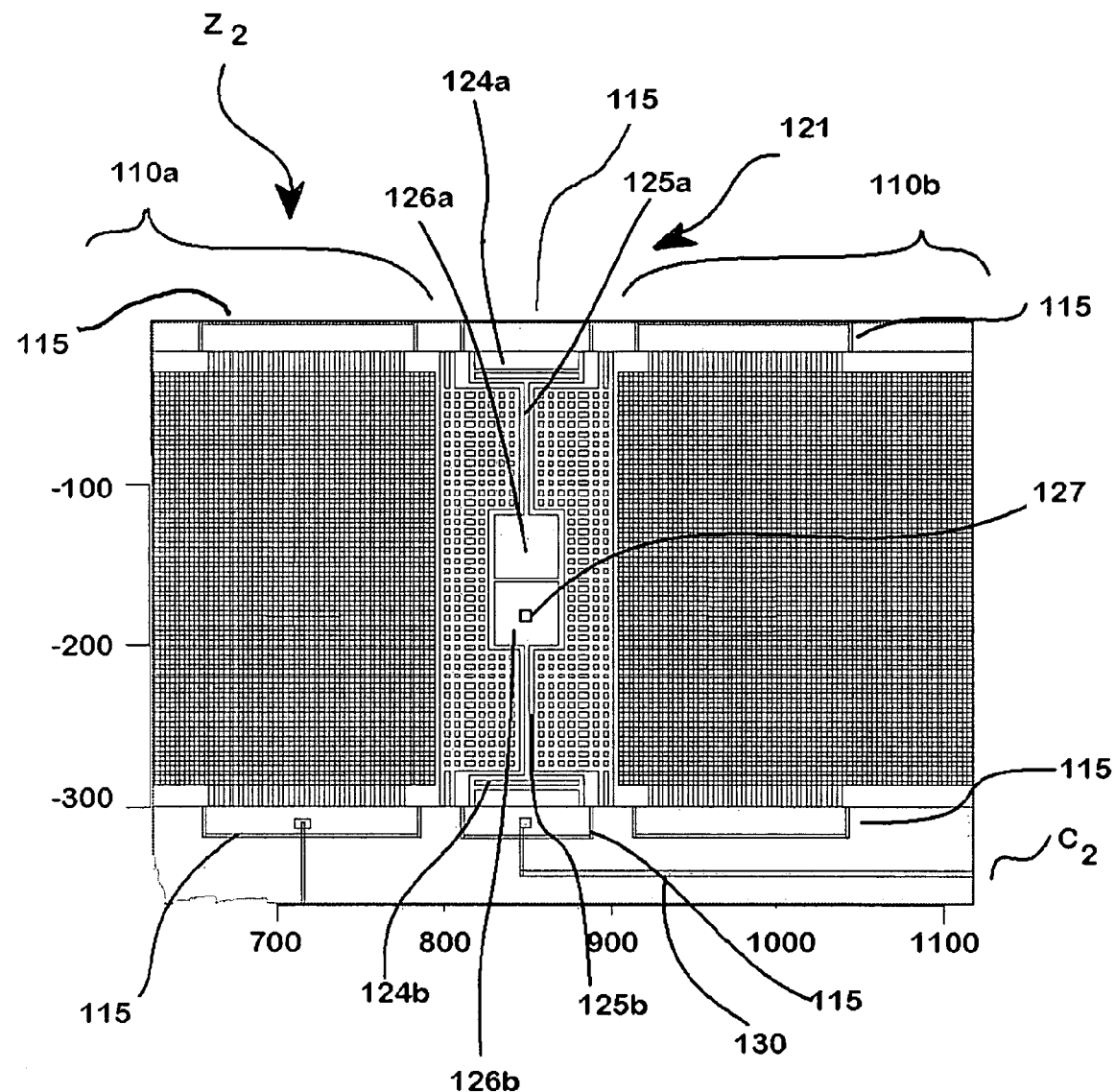
FIG. 5B is a plan view of a portion of the Z2 component of the accelerometer in FIG. 5A.
Figure 7:
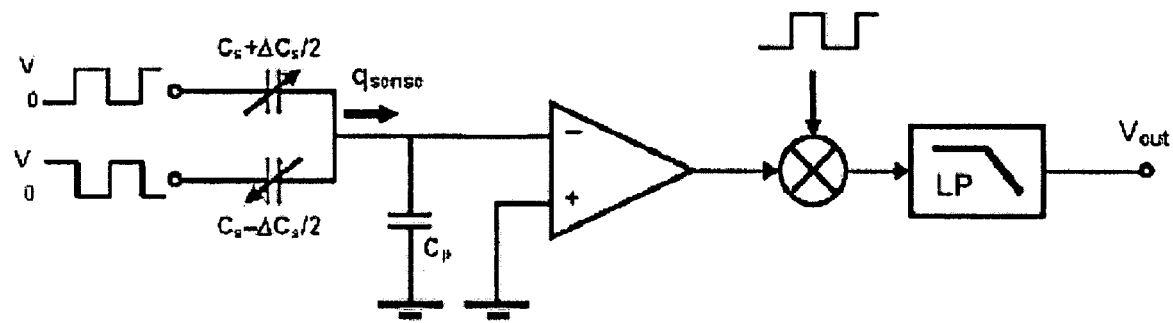
FIG. 7 is an electrical schematic of the capacitive circuit and sensing electronics.

FIG. 5B illustrates an enlarged portion of the Z accelerometer showing portion of the two static electrodes 110A and 110B, two spring elements 121 and the structure 135 around the spring 121 for the purpose of providing electrical isolation between the electrodes of the structure, and it is grounded by a line which is connected to ground pad. The trenches 115 provide electrical insulations between regions with different potential. The conductive lines or traces 130 provide electrical contact between them. An electrical contact or via 127 traverses the buried oxide layer 102 to provide electrical continuity between the square pad 126a and spring element 121a that connects the dynamic electrode plate 120 to terminal pad at the edge of the device. The white areas in the figure denote etched areas; therefore there is electrical insulation between each of the regions of the structure. As can be seen from the figure, the static electrode contains many holes (grid pattern) the size of each hole is 3×3 μm. The depth of each hole is 10 μm (thickness of the device layer). The distance between two holes is also 3 μm.

FIG. 5B also illustrates a more detailed view of the torsion structure 121 connecting the dynamic electrode to the substrate at the frame boundary 109 in FIG. 5A. Spring element 121 has two branched portions 124a and 124b that span the gap between the aperture 109 and the dynamic electrode 120. The branch portions 124 a and b each connect via a narrower segment 125a and b respectively to square pads 126a and b that holds the proof mass 122. The beam spring dimensions are 40×3×10 μm$^3$.

FIG. 6A-C illustrates the general principle of operation of the 3-D accelerometer of FIG. 4 for the simple case where the acceleration is restricted to a single coordinate axis. Thus each of FIG. 6A-C is an the x-axis elevation of the different dynamic electrode plate and proof mass for each of the X, Y and Z one dimensional accelerometers. It should be appreciated from these diagrams that acceleration in the two orthogonal directions X and Y that are in the plane of the substrate is primarily sensed by the accelerometers 100 of the type shown in FIG. 2. However, acceleration in the Z direction, orthogonal to the plane of the substrate is sensed by the accelerometer, denoted by bracket Z, that comprises two of the accelerometers of FIG. 2, denoted Z1 and Z2 in the figures.

In FIG. 6A, the relative movement of each dynamic electrode is shown for acceleration in the X-direction, as shown by the bold arrow beside the figure title. However, for the Y-axis sensor the orthogonal elevation of the dynamic electrode and proof mass is also shown just below the x-axis elevation. The torsion axis of each dynamic electrode, when viewed in section, is denoted by an upright triangle. The dashed lines show the equilibrium position of each dynamic electrode. Thus in FIG. 6A, the X-dynamic electrode to the right tilts, but the Y-dynamic electrode is stable. However, as the Z1 and Z2 dynamic electrodes have their center of masses on opposite sides they tilt in the same direction, the right side tilting up and the left side tilting down. It should be appreciated that and since the A and B electrode pairs are constituted from opposite sides of the Z1 and Z2 device, this movement in the same direction will create an equal and opposite change in capacitance for the combined electrodes so that the net change will be null.

In FIG. 6B, the relative movement of each dynamic electrode is shown for acceleration in the Y-direction, as shown by the letter "X" beside the figure title to indicate the acceleration is into the plane of the paper. However, only the Y-dynamic electrode tilts.

In FIG. 6C, the relative movement of each dynamic electrode is shown for acceleration in the Z-direction, as shown by the bold arrow beside the figure title. The X and Y dynamic electrodes do not tilt, as the proof mass has a center of gravity directly below the torsion axis. However, as the proof mass in each of the Z1 and Z2 dynamic electrodes is offset in a different direction laterally from the torsion axis, each electrode plates now tilts in opposite directions, forming an "x" shape profile. Now, the A and B electrodes pairs reinforce each other to increase the capacitance reading, rather than cancelling.

While it is preferred for some application that each of accelerometer be placed adjacent to each other in a row to form a device with a 3:1 aspect ratio, such as for placement in narrow catheter leads, other arrangements and combinations may be desired in different applications.

Preferably, the two Z-axis one dimensional accelerometer devices are co-planar with at least one of the X- and Y-one dimensional accelerometer devices, that is with the static electrode plates and torsion beam axis of all devices in a common plane. While the torsion beam component could be a single rod that extends entirely across the dynamic electrode, preferably the torsion beams have two co-linear segments that extend from the frame edge on to the second electrode.

The capacitive sensitivity was calculated by finite element methods (FEM) taking into account the grid structure of the top electrodes to account for the reduction in air damping due to the hole in the upper or static electrode plate.

The size of each hole in the electrode is 3×3 μm and the distance between two adjacent holes is also 3 μm. The gap between the static electrode and dynamic electrodes is 2.5 μm (the thickness of the buried oxide layer).

The static capacitance between moving and static electrodes was calculated at the equilibrium state. This required the calculation and accounting for the distribution of electric potential within the unit cell element of the electrode structure: The unit cell element for modeling purposes consisted of a segment of the moving electrode with a size of 6×6 μm (shown at the bottom of the figure) and a segment of the static electrode with a size of 6×6×0 μm³. The following boundary conditions were used in the calculations: 1) Bottom face of the structure corresponding to the moving electrode is grounded, 2) All facets corresponding to the static electrodes have potential V and all other facets have symmetry boundary conditions.

The capacitance was calculated from the formula:

$$W_S = \frac{1}{2}SV^2$$

Where Wc the electric energy of the capacitor and C is the capacitance

The simulations surprisingly showed that the resulting capacitance is only on a factor K=0.9738 which is smaller than the capacitance of the equivalent capacitor without the hole i.e. due to the grid pattern (and its hole structure) we lose only 2.62% from the capacitance. The air velocity within the unit cell due to the movement of the dynamic electrode was also considered in the model to calculate the therm-mechanical noise of the structure that arises from the air damping that results from the movement of the proof mass.

From the distribution of the air velocity resulting from the movement of the bottom of the moving electrodes in the Z direction the damping in the unit cell was calculated as the integral of the force that is applied against the direction of the motion. The resulting damping coefficient is:

$$D = \frac{D_S \cdot A}{36}$$

Where $D_0$=9$10^{-8}$ kg/sec and A is the area of the electrode in μm².

In each of the one dimensional accelerometers the sense capacitance between two electrodes (A and C for example) increases when the sense capacitance between the other electrodes (B and C for example) decreases by the same amount. These two sense capacitors are connected to create a half-bridge capacitor circuit of FIG. 7. The signal from a crystal oscillator with amplitude Vo is applied to the static electrodes A and B. The sense signal is read from the electrode in the proof mass (electrode C). This signal is then amplified by the pre-amplifier of an ASIC.

Following this, the signal is mixed with the original signal and following a low pass filter to obtain the output signal ($V_{out}$).

Figure 8:
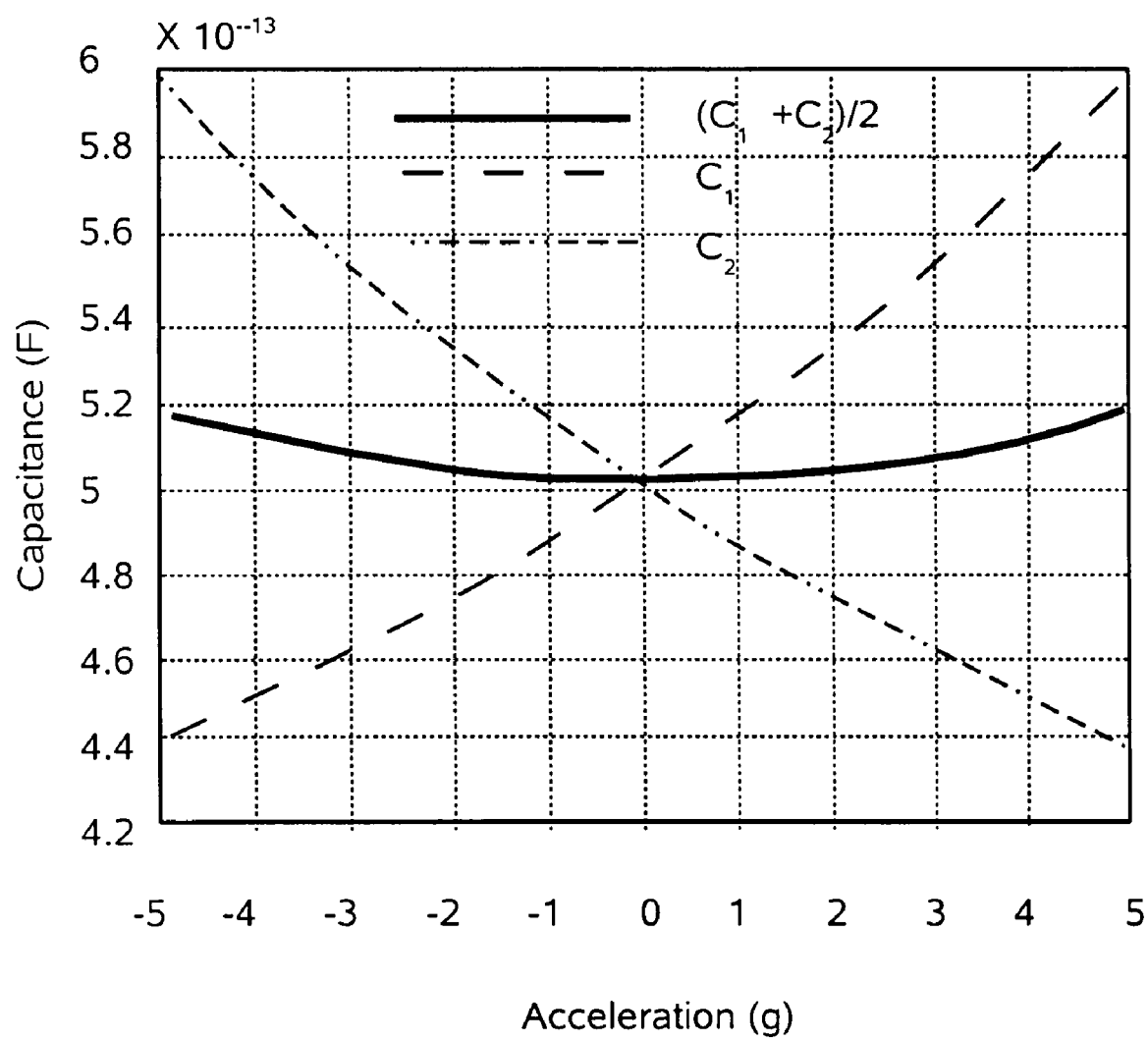
FIG. 8 is a graph of the capacitance changes of the X accelerometer vs. acceleration.

The FEM model was extended for the X and Y accelerometers of the type shown in FIG. 2, to calculate the change of the capacitance vs. the acceleration. FIG. 8 shows the calculated change in capacitance of the X or Y type accelerometer vs. acceleration for each pair of electrodes as well as the differential signal accelerometer. At the equilibrium the sense capacitance is about 0.5 pF. While the capacitance of the first electrode increases, the capacitance of the other sensing electrode decreases. This total change of the capacitance is also shown.

Figure 9:
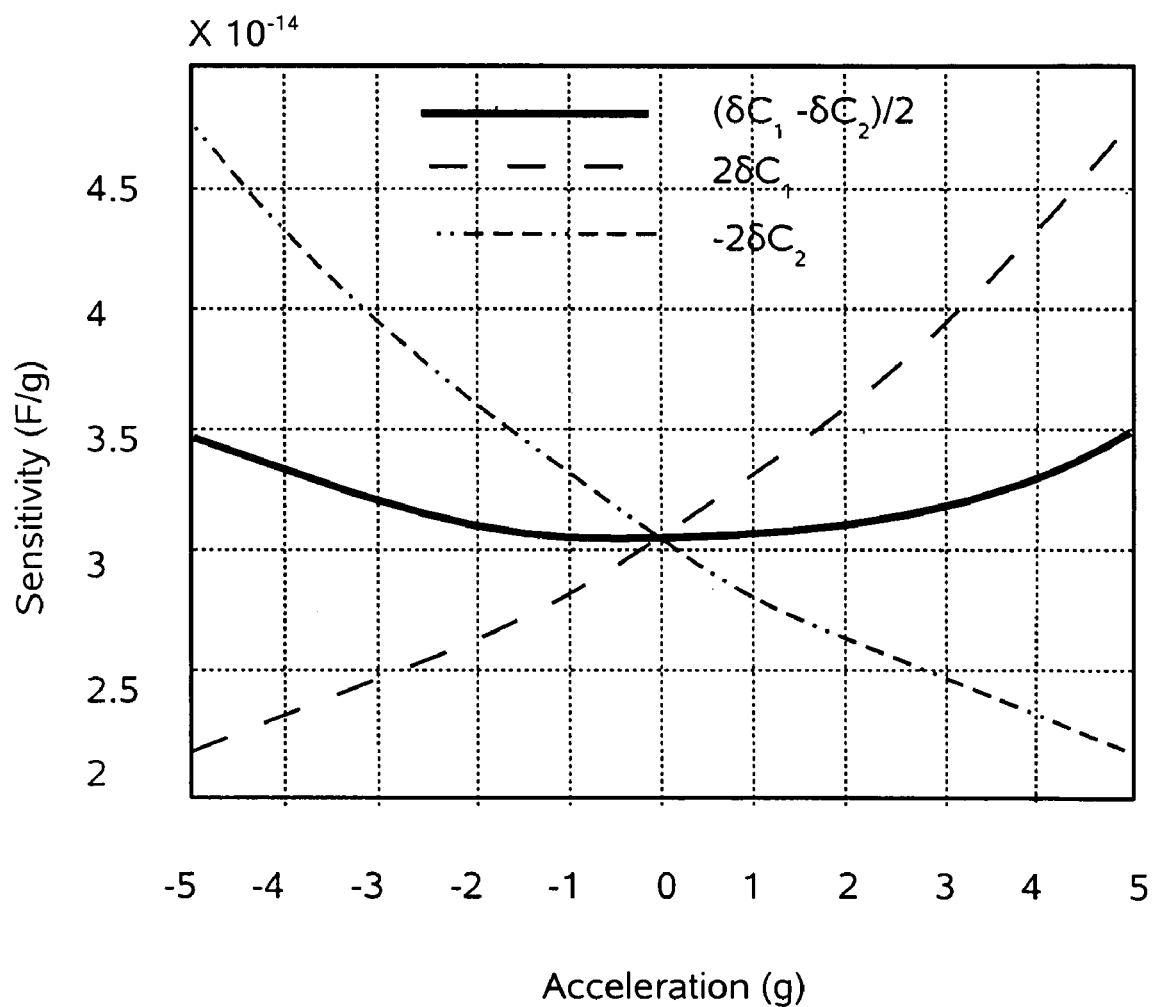
FIG. 9 is a graph of the Capacitive sensitivity of the X accelerometer vs. acceleration.

Further, as shown in FIG. 9 the capacitive sensitivity of the X, Y accelerometer was calculated vs. acceleration. The graph above shows the change of the capacitance sensitivity of the X (Y) accelerometer versus the acceleration. The total capacitance sensitivity is the difference of the capacitive sensitivities of the two sensing electrodes and is represented by the solid line. As we can see, the capacitance sensitivity at the equilibrium is about 31 pF/g.

Figure 10:
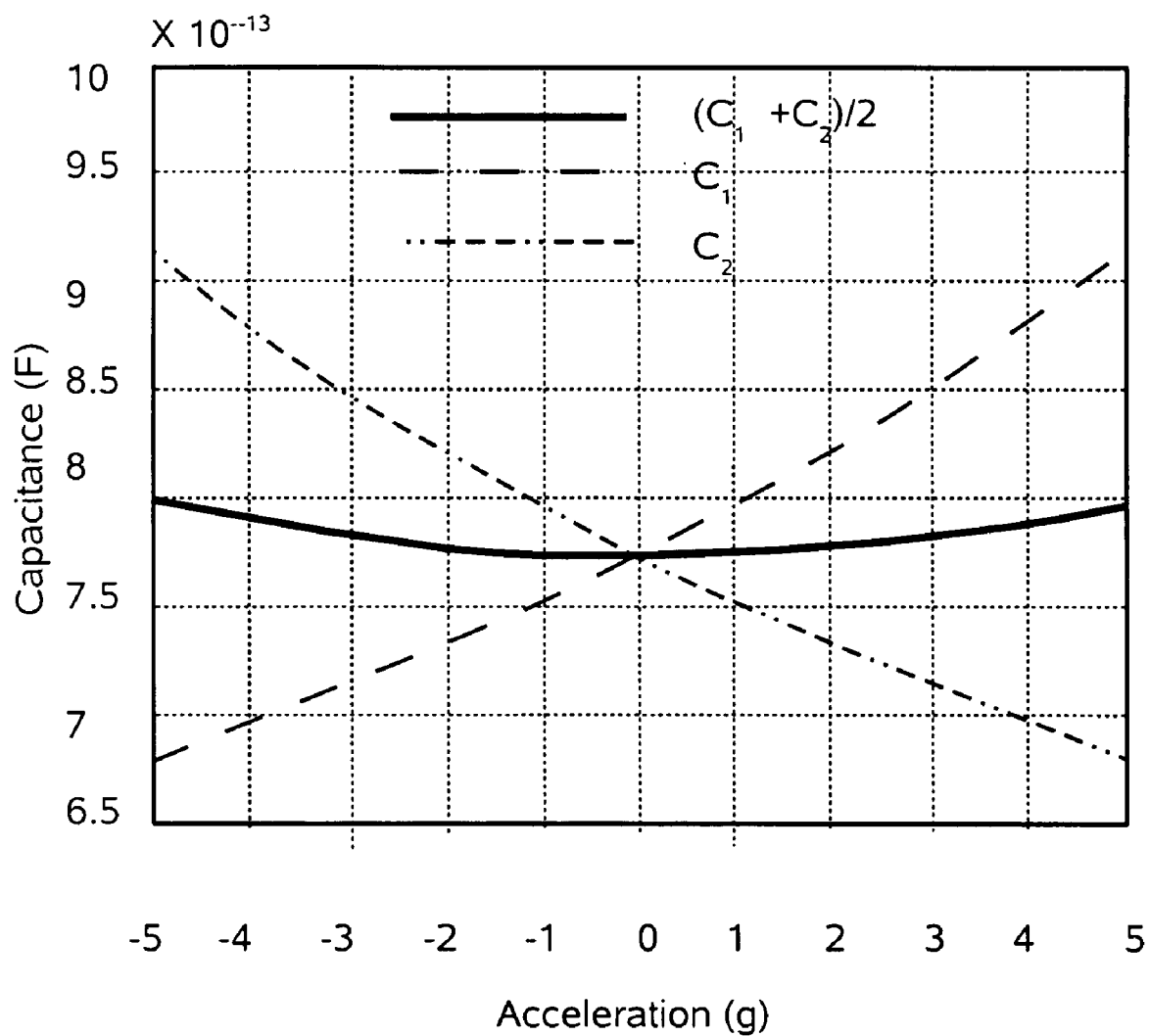
FIG. 10 is a graph of the capacitance of the Z accelerometer vs. acceleration.
Figure 11:
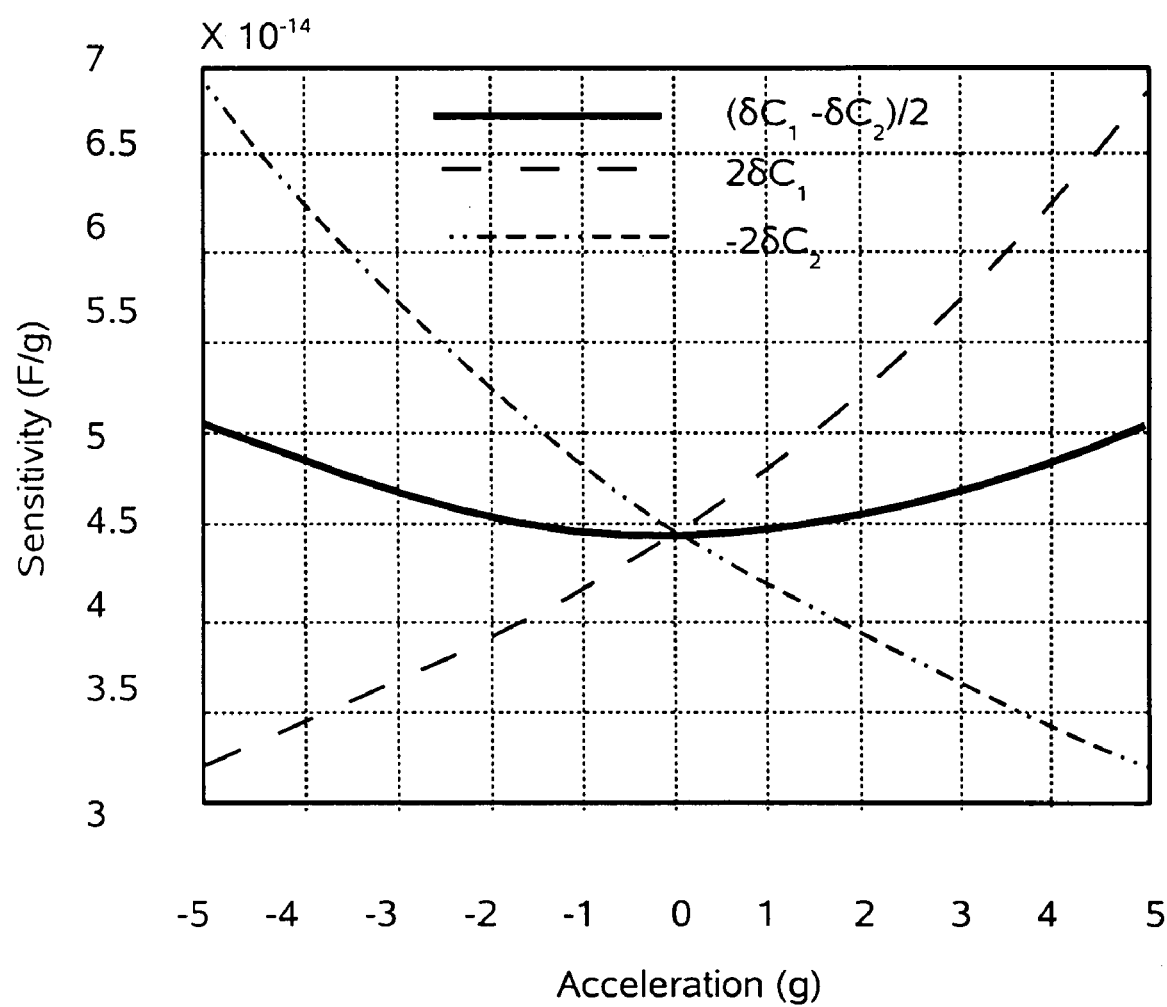
FIG. 11 is a graph of the capacitive sensitivity of the Z accelerometer vs. acceleration.

FIGS. 10 and 11 shows the results of the corresponding calculations for the Z axis accelerometer, we calculated the change of the capacitance vs. the acceleration. At the equilibrium the sense capacitance is about 0.77 pF. Likewise, while the capacitance of the first electrode increases, the capacitance of the other sensing electrode decreases. As shown in FIG. 11, the capacitance sensitivity of the Z-axis accelerometer at the equilibrium is about 45 fF/g.

The Table below summarizes the parameters for the specific embodiments of the X, Y and Z accelerometers described above

| Parameter | Values | Units |
| --- | --- | --- |
| Sensitivity (X, Y, Z) | 30.6, 30.6, 44.7 | fF/g |
| Sensing Electrode Capacitance (X, Y, Z) | 0.502, 0.502, 0.774 | pF |
| Parasitic Capacitance From MEMS | <1 | pF |
| Resonance Frequency (X, Y, Z) | 1.55, 1.55, 1.35 | kHz |
| Nonlinearity | 2 | % |
| Thermo-Mechanical Noise Floor (X, Y, Z) | 4.15, 4.15, 9.1 | μg/√Hz |
| Q-Factor (X, Y, Z) | 1.52, 1.52, 0.5 | |
| Capacitance Offset | ±5 | % |

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. An accelerometer device comprising;
   a) a substantially planar substrate having an aperture frame therein,
   b) one or more static electrodes plates extending into and over said aperture frame from the edge thereof,
   c) at least one dynamic electrode plate disposed to form capacitive circuit with respect to said one or more static electrodes plates,
   d) a proof mass coupled to and disposed below said dynamic electrode plate such that the COG (center of gravity) is below the plane of the dynamic electrode,
   e) at least one torsion beam extending from and spanning the aperture to support said one or more dynamic electrode plates,
   f) wherein the acceleration of said proof mass rotates said torsion beam and said at least one or more dynamic electrode plate whereby the capacitance of the circuit changes, wherein the at least one dynamic electrode plate is disposed below the static electrode plates to have a fixed gap when the torsion beam is in a neutral position and a gap that varies with distance from said torsion beam when said torsion beam rotates, and wherein the proof mass is laterally offset to dispose the center of gravity of the dynamic electrodes from the torsion beam axis.

2. An accelerometer according to claim 1 wherein the torsion beam is connected to the dynamic electrode plate by a layer of silicon oxide having substantially the same thickness as the gap between the static and dynamic electrode plates.

3. An accelerometer according to claim 1 wherein said at least one dynamic electrode plates and said one or more static electrode plates are interdigitated fingers having a fixed gap when the torsion beam is in a neutral or rotated position and a projected area that varies as the torsion beam rotates.

4. An accelerometer according to claim 1 comprising a first and second static electrode plates disposed on opposite sides of the torsion axis on a common substrate.

5. An accelerometer according to claim 4 wherein said proof mass is thicker than each of static and dynamic electrode plates.

6. An accelerometer according to claim 1 wherein the first and second electrode plates have a greater projected area parallel to said substrate than said proof mass.

7. An accelerometer according to claim 1 wherein the dynamic electrode plate is connected to the proof mass by a layer of silicon oxide.

8. An accelerometer according to claim 2 wherein the dynamic electrode plate is connected to the proof mass by a layer of silicon oxide.

9. An accelerometer according to claim 2 wherein the static electrode comprises two electrically isolated portions.

10. An accelerometer comprising:
   a) a substantially planar substrate having at least two aperture frames disposed therein,
   b) one or more static electrodes plates extending into and over each aperture frame from the edge thereof,
   c) at least one dynamic electrode plate disposed below said one or more static electrode plates associated with each aperture frame, wherein at least one capacitive sensing circuit is defined by the electrical communication between said one or more static electrode plate and said dynamic electrode plates, each dynamic electrode plate comprising:
      i) at least one torsion beam portion that spans the aperture frame to suspend each dynamic electrode plate below said one or more static electrode plates associated with the aperture frame, each torsion beam portion being parallel and disposed in the common plane parallel with the plane of said substrate,
      ii) a proof mass having at least a portion below the upper plane of the substrate and coupled to the at least one dynamic electrode plate,
      iii) each proof mass being laterally offset from the axis of the associated torsion beam portion in the opposite directions from the at least one dynamic electrode plate associated with the other aperture to cancel their respective capacitive charges induced by acceleration in the plane of the substrate and to add the capacitive charges induced by acceleration orthogonal to the plane of the substrate.

11. An accelerometer according to claim 10 wherein the proof mass further comprises a second portion laterally offset from the torsion beam axis, the second portion being disposed in substantially the same plane as the static electrode plates.

12. A three dimensional accelerometer comprising:
   a) a single support substrate,
   b) three or more apertures defined in said support substrate, wherein said apertures are disposed in a linear array, each aperture being associated with:
      i) one or more static electrodes plates extending into and over said aperture frame from the edge thereof,
      ii) at least one dynamic electrode plate disposed to form capacitive circuit with respect to said one or more static electrodes plates,
      iii) at least one proof mass coupled to and disposed below said dynamic electrode plate such that the COG (center of gravity) is below the plane of the dynamic electrode,
      iv) a least one torsion beam extending from and spanning the aperture to support said one or more dynamic electrode plates,
      v) wherein the acceleration or deceleration of said proof mass rotates said torsion beam one and said at least one more dynamic electrode plate whereby the capacitance of the circuit changes,
   c) wherein the first at least one proof mass associated with the first aperture is suspended from the support structure to permit movement and measure acceleration from the capacitive circuit when the proof mass moves in a first direction in the plane of the substrate,
   d) wherein the second at least one proof mass associated with the second aperture is suspended from the support structure to permit movement and measure acceleration from the capacitive circuit when the proof mass moves in a second direction in the plane of the substrate, the second direction being orthogonal to the first direction,
   e) wherein the third at least one proof mass associated with the third aperture is suspended from the support structure to permit movement and measure acceleration from the capacitive circuit when the proof mass rotates about an axis in the plane of the substrate.

13. A three dimensional accelerometer according to claim 12 wherein the third aperture is subdivided into two pairs of apertures each having:
   a) one or more static electrodes plates extending into and over each aperture frame from the edge thereof,
   b) at least one dynamic electrode plate disposed below said one or more static electrode plates associated with each aperture frame, wherein at least one capacitive sensing circuit is defined by the electrical communication between said one or more static electrode plate and said dynamic electrode plates, each dynamic electrode plate comprising:
      i) at least one torsion beam portion that spans the aperture frame to suspend each dynamic electrode plate below said one or more static electrode plates associated with the aperture frame, each torsion beam portion being parallel and disposed in the common plane parallel with the plane of said substrate,
      ii) a proof mass having at least a portion below the upper plane of the substrate and coupled to the at least one dynamic electrode plate,
      iii) each proof mass being laterally offset from the axis of the associated torsion beam portion in the opposite directions from the at least one dynamic electrode plate associated with the other aperture to cancel their respective capacitive charges induced by acceleration in the plane of the substrate and to add the capacitive charges induced by acceleration orthogonal to the plane of the substrate.

14. A three dimensional accelerometer according to claim 12 wherein each of the proof mass associated with the third aperture further comprises a second portion laterally offset from the torsion beam axis, the second portion being disposed in substantially the same plane as the static electrode plates.

15. A three dimensional accelerometer according to claim 12 the third aperture is sub-divided into equally width portion having a combined width substantially equal to the first and second apertures.

16. An accelerometer device comprising;
   a) a substantially planar substrate having an aperture frame therein,
   b) one or more static electrodes plates extending into and over said aperture frame from the edge thereof, c) at least one dynamic electrode plate disposed to form capacitive circuit with respect to said one or more static electrodes plates,
d) a proof mass coupled to and disposed below said dynamic electrode plate such that the COG (center of gravity) is below the plane of the dynamic electrode,
e) at least one torsion beam extending from and spanning the aperture to support said one or more dynamic electrode plates,
f) wherein the acceleration of said proof mass rotates said torsion beam and said at least one or more dynamic electrode plate whereby the capacitance of the circuit changes, wherein the at least one dynamic electrode plate is disposed below the static electrode plates to have a fixed gap when the torsion beam is in a neutral position and a gap that varies with distance from said torsion beam when said torsion beam rotates, and wherein the proof mass further comprises a second portion laterally offset from the torsion beam axis, the second portion being disposed in substantially the same plane as the static electrode plates.

17. An accelerometer device comprising;
a) a substantially planar substrate having an aperture frame therein,
b) one or more static electrodes plates extending into and over said aperture frame from the edge thereof,
c) at least one dynamic electrode plate disposed to form capacitive circuit with respect to said one or more static electrodes plates,
d) a proof mass coupled to and disposed below said dynamic electrode plate such that the COG (center of gravity) is below the plane of the dynamic electrode,
e) at least one torsion beam extending from and spanning the aperture to support said one or more dynamic electrode plates,
f) wherein the acceleration of said proof mass rotates said torsion beam and said at least one or more dynamic electrode plate whereby the capacitance of the circuit changes, wherein the at least one dynamic electrode plate is disposed below the static electrode plates to have a fixed gap when the torsion beam is in a neutral position and a gap that varies with distance from said torsion beam when said torsion beam rotates, wherein the torsion beam is connected to the dynamic electrode plate by a layer of silicon oxide having substantially the same thickness as the gap between the static and dynamic electrode plates, and wherein the torsion beam is formed in silicon and has an trench etched therein down to the silicon oxide layer to electrically isolate the dynamic electrode into two portions.

18. An accelerometer device comprising;
a) a substantially planar substrate having an aperture frame therein,
b) one or more static electrodes plates extending into and over said aperture frame from the edge thereof,
c) at least one dynamic electrode plate disposed to form capacitive circuit with respect to said one or more static electrodes plates,
d) a proof mass coupled to and disposed below said dynamic electrode plate such that the COG (center of gravity) is below the plane of the dynamic electrode,
e) at least one torsion beam extending from and spanning the aperture to support said one or more dynamic electrode plates,
f) wherein the acceleration of said proof mass rotates said torsion beam and said at least one or more dynamic electrode plate whereby the capacitance of the circuit changes, wherein the at least one dynamic electrode plate is disposed below the static electrode plates to have a fixed gap when the torsion beam is in a neutral position and a gap that varies with distance from said torsion beam when said torsion beam rotates, and wherein a portion of at least one of the static and dynamic electrode has a pair of electrically isolated portions adjacent the torsion beam that does not participate in the capacitive circuit.

* * * * *